(No Model.)
N. D. STANLEY.
TIRE UPSETTER.
No. 319,861. Patented June 9, 1885.
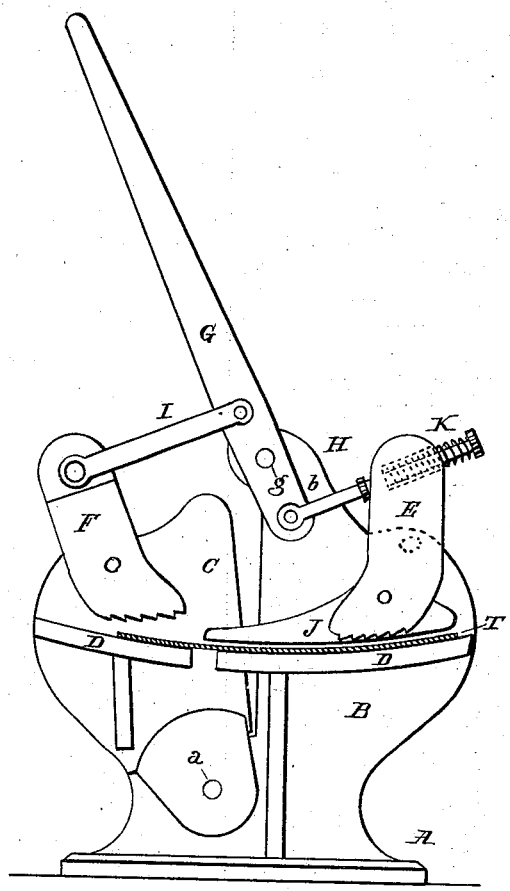
Witnesses:
James A. Harvey
James Lewis
Inventor:
Nelson D. Stanley
per
Charles E. Allen
Atty.

UNITED STATES PATENT OFFICE.

NELSON D. STANLEY, OF ESSEX JUNCTION, VERMONT.

TIRE-UPSETTER.

SPECIFICATION forming part of Letters Patent No. 319,861, dated June 9, 1885.

Application filed May 19, 1884. (No model.)

*To all whom it may concern:*

Be it known that I, NELSON D. STANLEY, a citizen of the United States, residing at Essex Junction, in the county of Chittenden and State of Vermont, have invented certain new and useful Improvements in Tire-Upsetters, of which the following is a specification, reference being had therein to the accompanying drawing.

My invention relates to improvements in tire-upsetting machines in which an actuating-lever operates to force a pair of pivoted clamps, to one of which, by an ankle-joint, an extension-foot is attached, down onto the tire, which rests upon a substantial concaved bed-plate, in which position the tire, being first properly heated, is rigidly held while it is compressed endwise by forcing the clamp which is attached to a pivoted block toward the clamp which is pivoted to a stationary block.

The liability of undue crimping which exists in machines of a similar character is effectually prevented by the pressure upon that portion of the tire exposed to such tendency of the extension-foot, the movement of which depends upon the clamp to which it is pivoted.

In the drawing accompanying my specification, the figure is a side elevation of the device as arranged preparatory to the upsetting operation.

A is a foundation-block of substantial character, to which the stationary vertical block B is rigidly attached.

C is a block pivoted to the block B at *a*. Both blocks are preferably made of metal.

D is a metallic bed-plate divided into two parts, which are so bolted or otherwise rigidly attached to the front face of the blocks B and C that when the interior edges of the blocks are forced together the upper surfaces or tops of the two parts of the bed-plate shall form a firm concave seat for the support of the tire T while it is being upset.

E and F are clamps so pivoted to the upper portion of the blocks B C, respectively, that their under and corrugated surfaces will be firmly pressed down upon the tire T, lying upon the bed-plate D, by the force of the lever G. This lever is fulcrumed by the pivot *g* on the lug *b*, which projects upwardly from the block B. It is connected with the upper extremity of each clamp by the pivoted rods H and I, located below and above the pin *g*, respectively.

J is a foot-piece which is pivoted to the clamp E for the purpose of rigidly holding down that portion of the tire T which rests upon the bed-plate which is attached to the block B, and thus effectually prevent any crimping of the tire during its compression, save in that portion which lies over the open space between the two parts of the bed-plate.

K is a coiled spring on the rod H, which is designed to automatically throw back the handle of the lever G, and thus keep the interior edges of the blocks B and C separate and the clamps and foot-extension raised a sufficient distance to allow the tire to be conveniently placed upon or removed from the bed-plate D.

The effect of pulling the lever G forward is, first, to press down the clamps E and F firmly upon the tire T. While held in this position a further depression of the lever brings the foot-extension J tightly down upon the tire. It is thus rigidly held till the process of upsetting is completed in the way desired by bringing the interior edges of the blocks B and C closely together by continuing the depression of the lever G, and no portion of the tire can be crimped, except that part which lies between the end of the foot J and the clamp F.

The device is simple and durable in construction and is susceptible of great power, while the leverage is so arranged that the force necessary to be exerted is comparatively small, and the crimping of the tire is confined to a single point.

I claim—

The combination, in a tire-upsetter, of a suitable pivoted operating-lever, the connecting-rods, the two clamps E F, one of the connecting-rods being provided with a spring, the bed D, made in two parts, and the parts C B of the base, substantially as set forth.

In testimony whereof I affix my signature in presence of two witnesses.

NELSON D. STANLEY.

Witnesses:
CHARLES E. ALLEN,
ELIAS LYMAN.